No. 631,796. Patented Aug. 29, 1899.
H. H. KNEPPER.
STORAGE BATTERY.
(Application filed June 27, 1898.)
(No Model.)
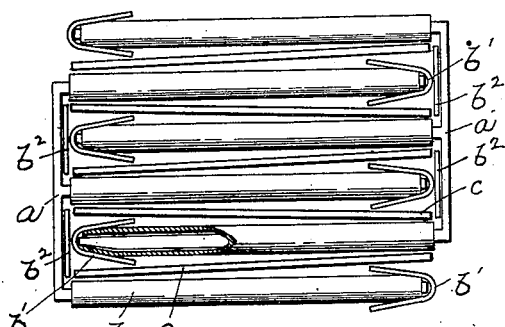
Fig. 1.
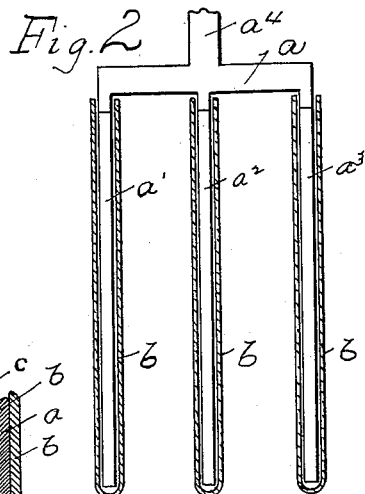
Fig. 2.
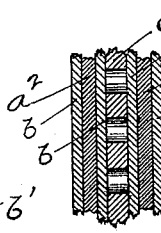
Fig. 6.
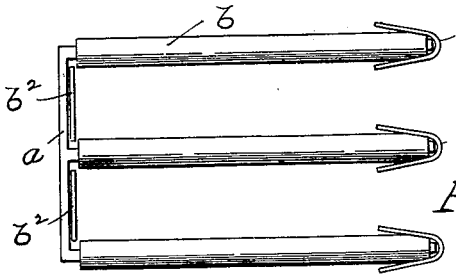
Fig. 3.
Fig. 4.
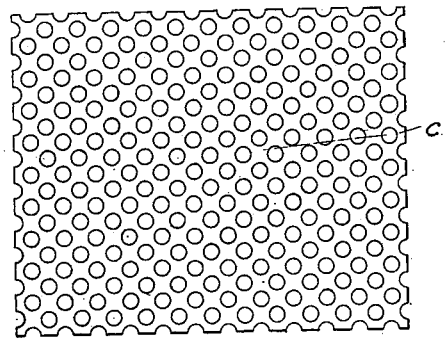
Fig. 5.
WITNESSES:
M. R. Rochford
R. D. Small
INVENTOR
Harry Hower Knepper
BY
Ludington + Jones
ATTORNEYS.

UNITED STATES PATENT OFFICE.

HARRY HOWER KNEPPER, OF CHICAGO, ILLINOIS, ASSIGNOR TO THE AMERICAN ELECTRIC VEHICLE COMPANY, OF SAME PLACE.

STORAGE BATTERY.

SPECIFICATION forming part of Letters Patent No. 631,796, dated August 29, 1899.

Application filed June 27, 1898. Serial No. 684,553. (No model.)

*To all whom it may concern:*

Be it known that I, HARRY HOWER KNEPPER, a citizen of the United States, residing at Chicago, in the county of Cook and State of Illinois, have invented a certain new and useful Improvement in Storage Batteries, of which the following is a full, clear, concise, and exact description, reference being had to the accompanying drawings, forming a part of this specification.

My invention relates to an electric storage battery, my object being to provide an improved construction of battery or accumulator adapted for electric vehicles and other uses in which the battery is subjected to considerable shaking and jarring, my purpose being to so construct the battery that the electrolyte will be prevented from spilling, and whereby the active material will be securely held in position and short-circuiting of the plates effectively prevented.

I have illustrated my invention in the accompanying drawings, in which—

Figure 1 is an end view of a storage battery embodying my invention. Fig. 2 is a sectional view through the plates of one polarity. Fig. 3 is an end view of said plates. Fig. 4 is a view of one of the plates, showing the covering or envelop thereof partially torn away. Fig. 5 is a plan view of one of the fillers or sheets adapted to be placed between the envelops inclosing the plates. Fig. 6 is a partial view showing the envelops and fillers expanded by the electrolyte.

Like letters refer to like parts in the several figures.

In accordance with my invention I provide envelops formed of sheets of absorbent material for completely surrounding the plates of the accumulator upon the faces, edges, and ends, and in the spaces between these envelops perforated fillers or sheets of absorbent material are placed, so that when the electrolyte is placed in the cell the perforated fillers, as well as the porous envelops, absorb the electrolyte and expand, thus making a compact structure which while effectively holding the active material in position and preventing the same from dropping to the bottom of the cell prevents the short-circuiting of the adjacent plates, which are usually of opposite polarity. The accumulator-plates $a'$ $a^2$ $a^3$, &c., are usually mounted upon a common support or cross-piece $a$, carrying the terminal $a^4$.

In assembling the cell the positive and negative plates are placed together, so that each plate is surrounded on opposite sides by plates of opposite polarity. Inclosing each of the plates is an envelop $b$, formed of a sheet of absorbent material, as paper or cardboard, completely surrounding the faces and edges of the plate. Over the end of the plate the cap $b'$ is provided, which completely covers the end of the plate, and in the space between the plates and resting against the cross-piece $a$ strips of absorbent paper or cardboard $b^2$ are placed, against which the caps $b'$ are adapted to be pressed. In the spaces between the envelops thus formed one or more fillers $c$ are placed, these fillers being formed in sheets and perforated and consisting of absorbent material, as paper or cardboard made of pulp or other fibrous material. When the electrolyte is placed in the cell, it is absorbed by the absorbent envelops and fillers, causing the same to expand and completely fill the spaces between the accumulator-plates. The surfaces of the plates are thus compressed between the pad-like envelops and fillers, and while serving to retain the liquid electrolyte and prevent its being spilled during the shaking and jarring of the cell they also serve to maintain the active material securely in position and prevent the falling of the active material to the bottom of the cell, which has been a serious objection to accumulators as heretofore constructed, and, furthermore, the complete inclosure of the accumulator-plates by the envelops prevents the active material from shifting in position, due to the shaking and jarring, to thereby bridge across the space between the opposite plates and produce a short circuit.

Where accumulators are employed in electric vehicles and in other places where they are subjected to continual vibration, great trouble has been experienced from the gradual falling away of the active material from the faces of the plates and the settling thereof to the bottom of the cell, where it soon forms a bridge which short-circuits the plates. The provision of the envelops entirely surrounding the plates on the faces and edges and the complete filling of the space between the plates with absorbent material entirely overcomes this difficulty. The perforation of the fillers $c$ $c$ forms inclosed receptacles for the liquid electrolyte, thus permitting the employment of a great deal more of the electrolyte than could be present if the fillers were solid, and, furthermore, due to the presence of these bodies of liquid, the internal resistance of the cell is greatly diminished.

Having described my invention, what I claim as new, and desire to secure by Letters Patent, is—

1. In combination, a series of accumulator-plates and an envelop for inclosing each of said plates said envelops comprising a sheet of absorbent material wrapped about the faces and edge of the plate, and a cap of absorbent material separate from said sheet and fitting over the end of said plate, substantially as described.

2. In combination, a pair of accumulator-electrodes each comprising a series of parallel plates, the plates of the two electrodes alternating in position, an envelop or sheet for each of said plates formed of absorbent material and surrounding the faces and edges thereof and caps of absorbent material separate from said sheets and fitting over the ends of said plates, substantially as described.

3. In combination, a pair of accumulator-electrodes each comprising a support or cross-piece and a series of parallel plates thereon, the plates alternating in position, and an envelop for each of said plates formed of absorbent material and comprising a sheet wrapped about the sides and edges of the plate, and a cap fitting over the end of the plate, and a sheet of absorbent material fitting between the said cap and the cross-piece or support, substantially as described.

4. The combination with the accumulator-plates, of an envelop or sheet for each of said plates formed of sheet absorbent material, a cap separate from said sheet fitting over the end of the plate and a filler placed between adjacent envelops and consisting of a sheet of absorbent material, substantially as described.

In witness whereof I have hereunto set my hand in the presence of two witnesses.

HARRY HOWER KNEPPER.

Witnesses:
KARSTON KNUDSON,
W. CLYDE JONES.